United States Patent
Sun et al.

(10) Patent No.: US 11,929,950 B2
(45) Date of Patent: Mar. 12, 2024

(54) SYSTEM AND METHOD FOR HIGH SPEED DOPPLER COMPENSATION IN A CELLULAR ENVIRONMENT

(71) Applicant: Apple Inc., Cupertino, CA (US)

(72) Inventors: Haitong Sun, Cupertino, CA (US); Wei Zeng, Saratoga, CA (US); Yushu Zhang, Beijing (CN); Hong He, San Jose, CA (US); Oghenekome Oteri, San Diego, CA (US); Sigen Ye, Whitehouse Station, NJ (US); Weidong Yang, San Diego, CA (US); Chunxuan Ye, San Diego, CA (US); Chunhai Yao, Bejing (CN); Dawei Zhang, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/441,962

(22) PCT Filed: Aug. 5, 2020

(86) PCT No.: PCT/CN2020/107204
§ 371 (c)(1),
(2) Date: Sep. 22, 2021

(87) PCT Pub. No.: WO2022/027361
PCT Pub. Date: Feb. 10, 2022

(65) Prior Publication Data
US 2023/0155760 A1    May 18, 2023

(51) Int. Cl.
*H04L 5/00*    (2006.01)
*H04B 7/01*    (2006.01)

(52) U.S. Cl.
CPC .............. *H04L 5/0048* (2013.01); *H04B 7/01* (2013.01); *H04L 5/0035* (2013.01)

(58) Field of Classification Search
CPC ... H04L 5/0048; H04L 5/0035; H04L 5/0078; H04B 7/01; H04W 52/242
(Continued)

(56) References Cited

U.S. PATENT DOCUMENTS 10,652,851 B2    5/2020    Vilaipornsawai et al.
2018/0083730 A1*    3/2018    Gulati ................. H04L 1/0004
(Continued)

FOREIGN PATENT DOCUMENTS

CN    108111272 A    6/2018
CN    109845348 A    6/2019
(Continued)

OTHER PUBLICATIONS

International Search Report and Written Opinion of the International Searching Authority directed to related International Patent Application No. PCT/CN2020/107204, dated Apr. 25, 2021; 7 pages.
(Continued)

*Primary Examiner* — Candal Elpenord
(74) *Attorney, Agent, or Firm* — Sterne, Kessler, Goldstein & Fox P.L.L.C.

(57) ABSTRACT

Methods and apparatuses are disclosed for calculating and compensating for Doppler shift in a high-speed environment. When in a high-speed environment, Doppler shifts on a transmitted radio frequency signal can become extremely large, which may make it difficult or even impossible for a receiving device to accurately decipher the signal. Therefore, embodiments of the present disclosure describe how tracking reference signals can be transmitted from multiple transmission/reception points, and processed by the UE. For example, the TRS transmitted from the TRP can be enhanced to allow for TRS information from two different TRPs. Additionally, or alternatively, a flag can be set within
(Continued)

TRS information that identifies it as having originated from either a first TRP or a second TRP. Additionally, the UE can calculate Doppler shift information and report that information back to the base station in a report message, such as an SRS message. In this manner, the base station can precompensate for the Doppler shift.

17 Claims, 10 Drawing Sheets

(58) Field of Classification Search
USPC .................................................. 370/329–330
See application file for complete search history.

(56) References Cited

U.S. PATENT DOCUMENTS

| | | | |
|---|---|---|---|
| 2020/0177416 A1 | 6/2020 | Jiang et al. | |
| 2021/0014931 A1* | 1/2021 | Noh | H04W 76/27 |
| 2023/0141785 A1* | 5/2023 | Manolakos | H04L 43/065 |
| | | | 455/67.16 |
| 2023/0179260 A1* | 6/2023 | Abdelghaffar | H04W 72/12 |
| | | | 370/329 |

FOREIGN PATENT DOCUMENTS

| | | |
|---|---|---|
| WO | WO 2020/028394 A1 | 2/2020 |
| WO | WO 2020/033198 A1 | 2/2020 |

OTHER PUBLICATIONS

3GPP, "Maintenance of multi-TRP enhancements," R1-2003469, Jun. 6, 2020, accessed at https://www.3gpp.org/ftp/tsg_ran/WG1_RL1/TSGR1_101-e/Docs.

Extended European Search Report directed to related European Application No. 20948798.2, dated Jan. 3, 2024, 20 pages.

Ericsson: "UE demodulation requirements for eMIMO", 3GPP TSG-RAN WG4 meeting #4, Electronic Meeting, Feb. 24-Mar. 6, 2020; R4-2001363,5 pages.

Ericsson: "Transmission scheme in NR PDSCH demodulation requirements for HST", 3GPP TSG-RAN WG4 meeting #95-e; R4-2007382, Electronic Meeting, May 25-Jun. 5, 2020, 3 pages.

Ad-Hoc Chair (Samsung): "Chairman's notes of AI 7.2.8 Enhancements on MIMO for NR", 3GPP TSG-RAN WG1 meeting #99; R1-1913385, Nov. 18-22, 2019, 12 pages.

* cited by examiner

US 11,929,950 B2

SYSTEM AND METHOD FOR HIGH SPEED DOPPLER COMPENSATION IN A CELLULAR ENVIRONMENT

This application is a U.S. National Phase of International Application No. PCT/CN2020/107204, filed Aug. 5, 2020, which is hereby incorporated by reference in its entirety.

FIELD

Various aspects generally may relate to the field of wireless communications.

SUMMARY

Some embodiments include an apparatus, method, and computer program product for implementing Doppler compensation in a high-speed cellular communication environment, such as on a high-speed train. In such a high-speed system, it will often be necessary for the UE to track Tracking Reference Signals (TRS) from multiple transmission and reception points (TRPs), which is not currently permitted in the Third Generation Partnership Project (3GPP) specification. Specifically, due to the rate of speed of the user equipment (UE), those TRSs will each undergo vastly different Doppler shifts. Therefore, to allow the UE to receive these signals, and to perform accurate Doppler measurements, the TRS can be modified. In one such embodiment, the CORESETPoolIndex variable within the TRS can be configured to notify whether the TRS is being received from a first or a second TRP. Additionally, the TRS is typically transmitted in two consecutive slots. Therefore, in another embodiment, the network configure the first slot to include the TRS from the first TRP, and the second slot to include the TRS from the second TRP. In any of these embodiments, a mechanism is needed for the network to notify the UE of the advanced channel estimation configuration. In embodiments, this can be done via Radio Resource Control (RRC), MAC-CE, or via configuration of the TRS, as described above.

In an embodiment, a user equipment is disclosed that includes a transceiver configured to transmit and receive signals between a first transmission-reception point (TRP) and a second TRP and one or more processors. The one or more processors are configured to receive reference signals from a plurality of TRPs via the transceiver, each reference signal including an identifier, determine an originating TRP as being one of the first TRP or the second TRP based on the identifier, calculate Doppler shifts associated with each of the first TRP and the second TRP based on the determining, coherently combine the plurality of reference signals based on the calculating, and transmit an uplink signal via the transceiver to at least one of the first TRP or the second TRP based on the combined plurality of reference signals.

In an embodiment, the identifier is a CORESETPoolIndex variable.

In an embodiment, a CORESETPoolIndex value of 0 identifies the first TRP as the originating TRP, and a CORESETPoolIndex value of 1 identifies the second TRP as the originating TRP.

In an embodiment, a CORESETPoolIndex variable being absent in the received reference signals identifies the first TRP as the originating TRP.

In an embodiment, the reference signals are included within corresponding Tracking Reference Signals (TRSs) transmitted from the TRPs.

In an embodiment, the reference signals are triggered with Downlink Control Information (DCI) received in the CORESET configured with the corresponding CORESETPoolIndex.

In an embodiment, the reference signals include a first pair of TRS symbols in a first slot associated with the first TRP, and a second pair of TRS symbols in a second slot associated with the second TRP, wherein the first and second slot are consecutive.

In an embodiment, a user equipment for reporting Doppler shift to a transmission-reception point (TRP) is disclosed that includes a transceiver configured to transmit and receive signals with a first TRP and a second TRP, and one or more processors. The one or more processors are configured to receive a reference signal from at least one the first TRP and the second TRP, estimate a Doppler shift associated with each of the first TRP and the second TRP based on the received reference signal, generate a reporting signal based on the estimated Doppler shift, and transmit the reporting signal to the gNB via the transceiver.

In an embodiment, the one or more processors are further configured to determine a reporting scheme based on the estimated Doppler shift.

In an embodiment, the reporting signal includes a signed difference value corresponding to the difference between a Doppler shift associated with the first TRP and a Doppler shift associated with the second TRP.

In an embodiment, the reporting signal includes a first Doppler shift associated with the first TRP and a second Doppler shift associated with the second TRP.

In an embodiment, the reporting signal includes an unsigned absolute value of a difference between a first Doppler shift associated with the first TRP and a second Doppler shift associated with the second TRP.

In an embodiment, the reporting signal includes a first absolute Doppler shift associated with the first TRP, and a difference value corresponding to a difference between the absolute first Doppler shift and an absolute second Doppler shift associated with the second TRP, together with the signs of the first Doppler shift and the second Doppler shift.

In an embodiment, the reporting signal is a channel state information (CSI) message, and wherein Doppler shift information is encoded into a CSI Report configured by CSI-ReportConfig.

In an embodiment, a transmission reception point (TRP) for compensating for Doppler shift in a high-speed environment is disclosed that includes a transceiver configured to communicate with a user equipment (UE) and one or more processors. The one or more processors are configured to receive a notification from a backend as to whether the TRP is a first TRP or a second TRP, generate a tracking reference signal based on the received notification, and transmit the tracking reference signal to the UE, where the tracking reference signal includes an identifier based on the received notification.

In an embodiment, the identifier is a value of a variable within the tracking reference signal.

In an embodiment, the variable is a CORESETPoolIndex and the one or more processors are further configured to set the value of the variable to 0 in response to the received notification indicating that the TRP is the first TRP and set the value of the variable to 1 in response to the received notification indicating that the TRP is the second TRP.

In an embodiment, the one or more processors are further configured to receive a reporting signal from the UE, the reporting signal including Doppler shift information associated with the TRP, calculate a precompensation based on the received Doppler shift information, and generate a signal transmission to the UE based on the calculated precompensation.

In an embodiment, the precompensation increases a frequency of the signal transmission in response to the Doppler shift information demonstrating a negative frequency shift, and wherein the precompensation decreases the frequency of the signal transmission in response to the Doppler shift information demonstrating a positive frequency shift.

In an embodiment, the one or more processors are further configured to receive a two-TRP flag from the backend, and in response to receiving the two-TRP flag, the generating the tracking reference signal includes transmitting reference information within only one of a first slot or a second slot of the tracking reference signal based on the received notification It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

DETAILED DESCRIPTION

A Tracking Reference Signal (TRS) plays a crucial role, especially, at mmWave frequencies to minimize time and frequency errors that may occur as a result of Doppler shift.

In high-speed systems, it will often be necessary for the UE to track TRSs from multiple transmission and reception points (TRPs). Specifically, due to the rate of speed of the user equipment (UE), the UE must be capable of quickly transitioning from one TRP to another, and sometimes communicating with both simultaneously.

Additionally, when the UE travels at a sufficiently high rate of speed, there can be significant Doppler shift in both TRSs. Doppler shift occurs when a transmitter of a signal is moving in relation to the receiver. The relative movement shifts the frequency of the signal, making it different at the receiver than at the transmitter. In other words, the frequency perceived by the receiver differs from the one that was originally emitted by the transmitter. When the Doppler shift exceeds 1 kHz, the performance degradation becomes more profound.

In high-speed systems, such as in a high-speed train, the UE may be traveling at rates exceeding 500 km/h. In high frequency bands, such as on the order of 5-6 GHz, this speed results in Doppler shifts in signals received from a given TRP by up to 2 kHz. This greatly reduces the channel capability, or makes it very challenging for the UE to perform accurate channel estimation. Therefore, there is needed a system capable of accurately estimating the channel even when moving at high rates of speed between two different TRPs.

Figure 1:
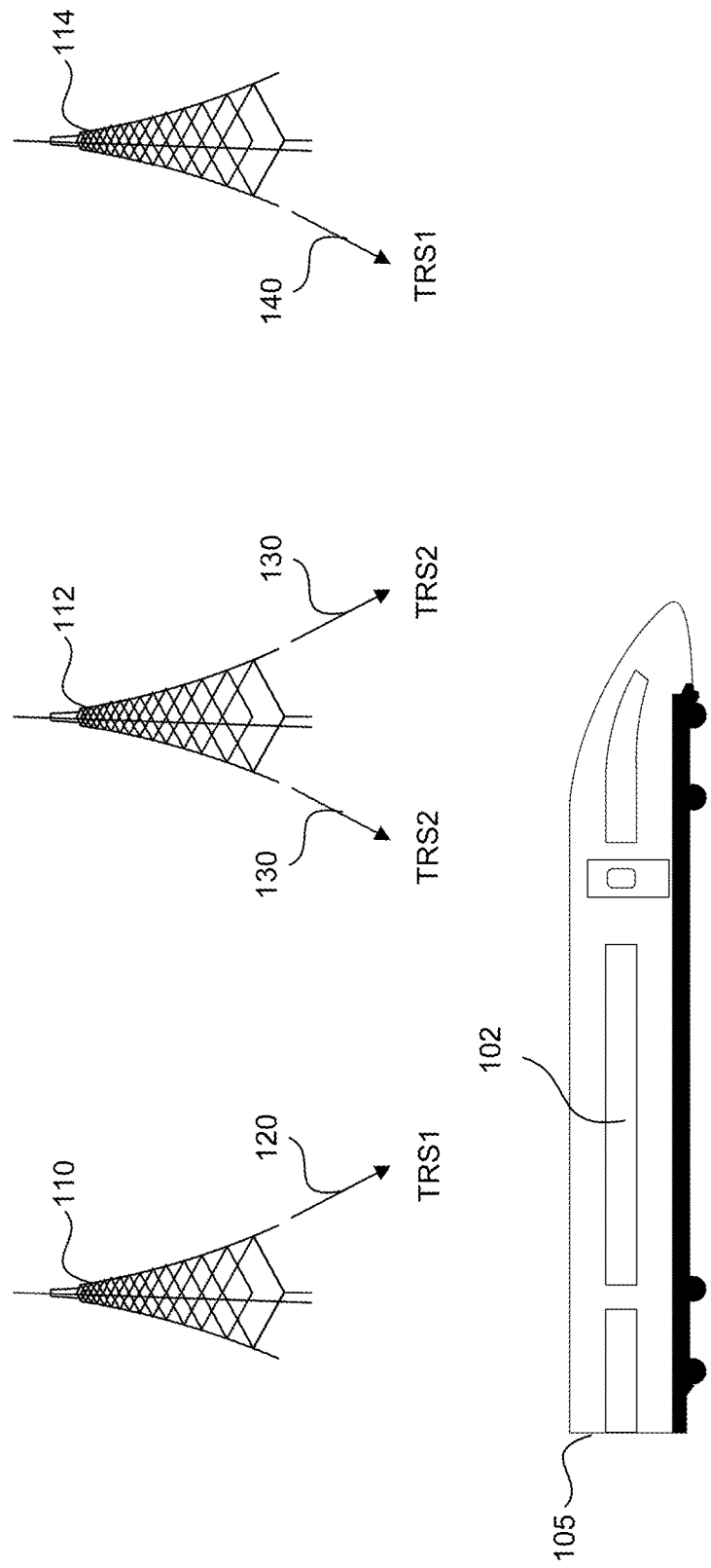
FIG. 1 illustrates an exemplary wireless communication environment according to an aspect of the disclosure.

FIG. 1 illustrates an exemplary wireless communication environment 100 according to an embodiment. As shown in FIG. 1, the environment 100 includes a plurality of TRPs 110, 112, and 114 positioned near a traveling path of a UE 102. In the example of FIG. 1, the UE 102 is located on a fast-moving vehicle, such as a high-speed train (HST) 105. Although the implementations described herein are with respect to a high-speed train, other high-speed environments are also contemplated. Therefore, all such high-speed environments will be collectively referred to as high-speed train (HST) in this disclosure.

As the UE 102 travels through the environment 100, it will pass within the transmission ranges of the various TRPs 110, 112 and 114. Within the range of the first TRP 110, the UE 102 will receive TRS 120 associated with the first TRP 110. Within the range of the second TRP 112, the UE 102 will receive TRS 130 associated with the second TRP 112. Finally, within the range of the third TRP 114, the UE 102 receives TRS 140 associated with the third TRP 114.

As the UE travels between two consecutive TRPs, the UE 102 according to embodiments of the present disclosure, receives TRSs from each of the nearby TRPs. Thus, as shown in FIG. 1, while the UE is traveling between the first TRP 110 and the second TRP 112, the UE 102 receives both TRS 120 and TRS 130 as TRS1 and TRS2, respectively. Similarly, as the UE 102 travels between the second TRP 112 and the TRP 114, the UE 102 receives both TRS 130 and TRS 140 as TRS2 and TRS1, respectively.

Figure 2:
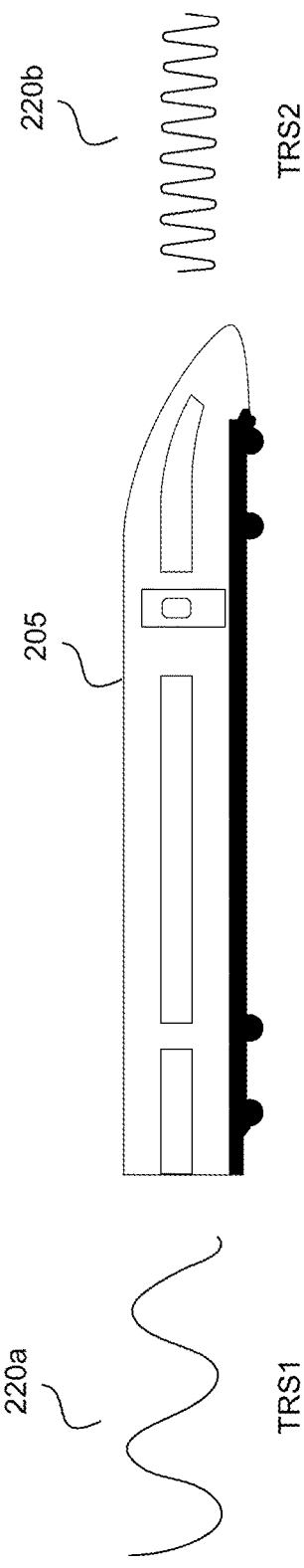
FIG. 2 illustrates an exemplary Doppler effect on transmission signals within a wireless communication environment according to an aspect of the disclosure.

FIG. 2 illustrates an exemplary Doppler effect on transmission signals within a wireless communication environment 200 according to embodiments. In the example shown in FIG. 2, the HST 205 travels in a rightward direction, and is positioned for example between TRP 110 and TRP 112. While traveling at a high rate of speed, a signal transmission 220a from the TRP 110 (positioned behind the train) will appear stretched out to the UE located on the HST 205. This will result in a lower apparent frequency than that which was originally transmitted from the TRP 110 due to the Doppler shift that occurs from the UE's movement speed. Meanwhile, a signal transmission 220b from the TRP 112 (positioned ahead of the train) will appear compressed to the UE located on the HST 205. This will result in a higher apparent frequency than that which was originally transmitted from the TRP 112 due to the Doppler shift resulting from the UE's movement speed.

In resolving these issues, the network can be configured to precompensate for the Doppler shift, provided that the network is aware of the actual amount of Doppler shift taking place from the various TRPs. By precompensating for these shifts, the two signals (TRS from first TRP and TRS from second TRP) arrive at the UE side without any additional shift, and therefore can be coherently combined. This gives maximum channel capacity.

TRS Enhancement

In an embodiment, compensating for the Doppler shifts can be achieved through enhancements to IRS configurations. In order to do this, the UE should be capable of tracking the TRSs from two different TRPs. Therefore, in an embodiment, for any non-zero power (NZP) CSI-RS ResourceSet (NZP-CSI-RS-ResourceSet) in which the TRS is configured, the variable CORESETPoolIndex can also be configured. When the variable is set to 0 (CORESETPoolIndex=0), or when it is absent, the UE interprets this as meaning that the TRS is transmitted from the first TRP. Alternatively, when the variable is set to 1 (CORESETPoolIndex=1), the UE interprets this as meaning that the TRS is transmitted from the second TRP.

In another embodiment, the Downlink Control Information (DCI) can indicate to the UE which TRP is appropriate. For example, for the DCI decoded in the CORESETPool associated with CORESETPoolIndex=0, the UE recognizes the triggered Aperiodic Tracking Reference Signal (AP-TRS) and the corresponding Periodic Tracking Reference Signal (P-TRS) as being transmitted from the first TRP. Alternatively, for the DCI decoded in the CORESETPool associated with CORESETPoolIndex=1, the UE recognizes the triggered AP-TRS and the corresponding P-TRS as being transmitted from the second TRP.

Figure 3:
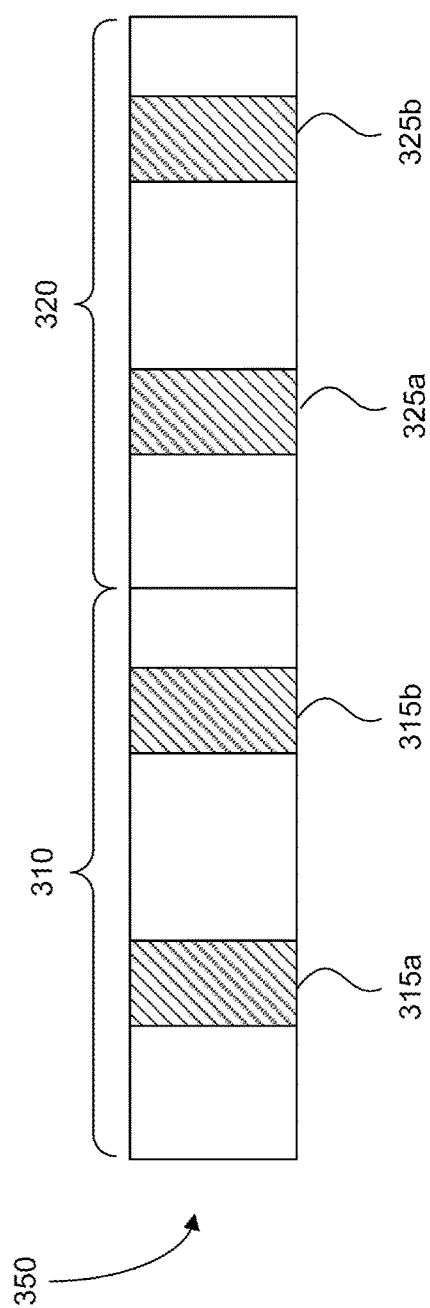
FIG. 3 illustrates an exemplary tracking reference transmission signal according to an aspect of the disclosure.

FIG. 3 illustrates an exemplary TRS transmission signal 300 according to an exemplary embodiment. For ease of explanation, the transmission signal 300 illustrated in FIG. 3 includes two signal slots 310 and 320. As is known, a typical TRS is transmitted across four OFDM symbols in the two consecutive slots 310 and 320. Traditionally, this would result in symbols 315a, 315b in the first slot 310 and symbols 325a and 325b in the second slot being devoted to a single TRS. In other words, by setting trs-info, an NZP-CSI-RS-ResourceSet can be configured as TRS, with four periodic NZP CSI-RS resources in two consecutive slots with two periodic NZP CSI-RS in each slot.

In an embodiment, a separate information element (IE) is added to a non zero power (NZP) CSI-RS-ResourceSet to enable HST TRS, when the IE is indicated. In this scenario, the first two NZP CSI-RS resources transmitted in the first slot correspond to TRS from the first TRP, whereas the second two NZP CSI-RS resources transmitted in the second slot correspond to TRS from the second TRP, where this configuration herein referred to as 2-TRS. If applicable, the TRS resources in the first slot are quasi-colocated (QCL) with QCL-typeA and QCL-typeD. Likewise, the TRS resources in the second slot are quasi-colocated (QCL) with QCL-typeA and QCL-typeD. As is known, QCL-typeA describes symbols transmitted with the same delay spread and QCL-typeD describes symbols transmitted with the same spatial beam. Notably, there is no QCL assumption between the NZP CSI-RS resources transmitted in different slots.

Because the two slots are typically used to support a single TRS, replacing this scheme with support for TRS from two TRPs may cause errors. Specifically, the UE may not be able to estimate the Doppler accurately given that only half the amount of information is being provided. In other words, whereas the 2-TRS configuration may be sufficient for FR2 (frequency bands from 24.25 GHz to 52.6 GHz), it may be insufficient for FR1 (sub-6 GHz frequency bands). Therefore, in an embodiment, conditions are placed on the 2-TRS transmission to ensure that the TRS is transmitted widely enough. Specifically, in embodiments, the network can configure 2-TRS for FR2 any time subject to UE capability. However, the network can only configure 2-TRS for FR1 when the configured TRS occupies at least 52 Physical Resource Blocks (PRB) in the frequency domain.

Notably, the above HST configurations unnecessarily consume bandwidth and computing power, and can result in worse overall performance when the UE is not experiencing an HST condition. Therefore, in embodiments, a mechanism is provided for triggering or signaling HST mode between the UE and the network. In one such embodiment, HST mode can be configured via. Radio Resource Control (RRC) or Medium Access Control control element (MAC-CE). In a preferred implementation, the HST configuration is signaled explicitly in the RRC, for example in the PDSCH-Config. However, in an alternative embodiment, HST can be implicitly signaled to the UE, such as by the TRS being implicitly mapped to a TRP in a logical way, such as via the CORESETPoolIndex, as described above.

SRS Sounding Enhancement

Sounding is a method by which the TRP determines the channel quality of the uplink path for a given UE. Sounding is currently carried out by a Sounding Reference Signal (SRS) that transmitted by the UE, and which is configured by the RRC. As discussed above, in the HST situation, if the TRP wants to precompensate for the Doppler shift, the TRP needs to first estimate the Doppler shift. In an embodiment, a new SRS configuration is disclosed with usage set to "HST". In this embodiment, the transmission of the SRS is frequency locked based on the TRS so that the TRP can make sure which frequency, the UE is transmitting the SRS on. This allows the TRP to accurately determine the Doppler shift.

This can also be achieved in other ways. For example, in an embodiment, the SRS is transmitted with the same beam used for the reception of the TRS. In still a further embodiment, the SRS is transmitted with the power control based on the pathloss estimated from the TRS. This allows the UE to estimate the phase change between the SRS transmitted and the SRS after Doppler shift. In this embodiment, the TRS can be used by the UE to derive uplink power control and an uplink frequency for transmitting the SRS so that the TRP can estimate an absolute Doppler shift. Specifically, the SRS is transmitted with the frequency estimate from the TRS and/or the SRS is transmitted with the power control based on the pathloss estimated from the TRS.

In an embodiment, the TRS can be used as the spatial relation reference signal for the SRS transmission. When used in this manner, the SRS is transmitted with the frequency estimate from the TRS and with the same beam used for TRS reception.

In the above-described embodiments, the pathloss reference signal and the spatial relation reference signal should be configured consistently with one another. This ensures that power computation is accurate. However, this requires two different reference signals, one for which beam is to be transmitted, and the other for the pathloss estimation. Thus, in an embodiment, if the TRS is configured as the pathloss reference signal for SRS, the same TRS should be configured for the spatial relation reference signal for the same SRS. Likewise, when a TRS is configured for the spatial relation reference signal for the SRS, the same TRS should be configured as the pathloss reference signal for the same SRS.

Whereas the above relates to SRS, it is desirable to be able to differentiate which SRS corresponds to which TRP. This is because, as described above, there are two TRPs and two TRSs. In an embodiment, this differentiation is accomplished based on Aperiodic SRS (AP-SRS), which is triggered by DCI. In the DCI, the AP-SRS is scheduled in a particular corset, which is configured with a corresponding CORESETPoolIndex. Thus, by triggering DCI with different CORESETPoolIndexes, the UE can distinguish the SRS as being from the first TRP or the second. For example, when the AP-SRS is triggered with the DCI scheduled in CORESET with CORESETPoolIndex=0, the NZP CSI-RS resource associated with CORESETPoolIndex=0 is used. Meanwhile, when the AP-SRS is triggered with the DCI scheduled in CORESET with CORESETPoolIndex=1, the NZP CSI-RS resource associated with CORESETPoolIndex=1 is used.

Notably, the conventional construction of the SRS does not support Doppler shift estimation in the same manner as the TRS. Specifically, the SRS needs to have two symbols in the slot, having a minimum symbol distance between them to ensure best estimation quality. But SRS does not currently allow this structure. Therefore, in an embodiment, the SRS configuration is modified to allow for TRP Doppler shift estimation. This can be instantiated with a special flag in SRS-ResourceSet, "trs-info". In this embodiment, up to four SRS resources can be configured in each SRS resource set. These four SRS resources are transmitted in two consecutive slots, with two SRS resources in each slot. With a given slot, the two SRS resources have a distance of N symbols, where N is 3, 4 or 5 symbols. Although, the starting symbol of the first SRS resource in each slot can be flexibly indicated, the relative location of the SRS resources within the slot should be the same. This allows the TRP to estimate Doppler shift based on SRS. In order to support this embodiment, a modification to the current 3gpp specification may be required.

CSI Reporting Enhancement

As discussed above, there are two ways in which the TRP can acquire the Doppler shift. The first is for the TRP to estimate the Doppler shift based on SRS, as described above. In another embodiment, the UE estimates the Doppler shift and reports this information to the TRP. In one such embodiment, this reporting is defined in a new CSI report, which is not currently supported in the 3gpp specification.

The CSI Report framework is made up of two primary components: one for the configuration, and the other for Triggering States which are associated with a specific configuration. The former includes one or more CSI-Report-Config fields defining the configurations. In this embodiment, TRS is configured as CMR, i.e., resourcesForChannelMeasurement, which is configured in CSI-ResourceConfig. In the CSI-ReportConfig, when the TRS is configured as CMR, a new reportQuantity is introduced, referred to herein as "FrequencyShift". The UE then reports the frequency estimated on the configured TRS as CMR within the ReportConfig field.

In another embodiment, multiple CSIs are configured such that the UE can report frequency shifts corresponding to both the first TRP and the second TRP in a single report. In one such embodiment, a single TRS is configured as CMR, but contains NLP CSI-RS resources from multiple TRPs. In an alternative embodiment, more than one TRS is configures as CMR, which each correspond to a separate TRP.

The manner in which the UE reports these frequency shifts is also considered. In an embodiment, the UE reports only the different between the two frequency shifts. In other words, the UE calculates the different between the frequency shift from the first TRP and that of the second TRP, and reports the different. In this embodiment, the difference value is signed so that the network can determine which of the TRPs has the positive, versus the negative, Doppler shift.

In another embodiment, the UE reports the absolute value of the difference between the frequency shift from the first TRP and that of the second TRP. Because the two TRPs will be known to have opposite signs in their respective frequency shifts, the sign of the difference may not always be needed. Therefore, in an embodiment, in order to conserve bandwidth, the difference is reported as an unsigned absolute value.

In another embodiment, the UE reports the absolute value of the frequency shift of the first TRP, and the difference for the frequency shift of the second TRP. In other words, the UE reports (|TRP1shift|, TRP1shift-TRP2shift).

As discussed above, the frequency shift can be reported in a new reportQuantity.

However, in an embodiment, the frequency shift is reported in addition to the existing reportQuantity to allow better TRP precompensation and beamforming. In this embodiment, the UE reports the frequency shift together with the already-defined CRI-RI-PMI-CQI reportQuantity. In this manner, the UE informs the TRP o the frequency shift and relative phase for each TRP. The reported frequency shift allows the TRP to compensate and for the frequency shift, and the reported phase allows the TRP to ensure coherent reception.

In another embodiment, the UE reports the frequency shift together with the already-defined CRI-RI-LI-PMI-CQI reportQuantity. In an embodiment, the UE reports the quantized phase that the UE would like for the TRP to apply, where the phase is the phase difference between the first TRP and the second TRP.

Figure 4:
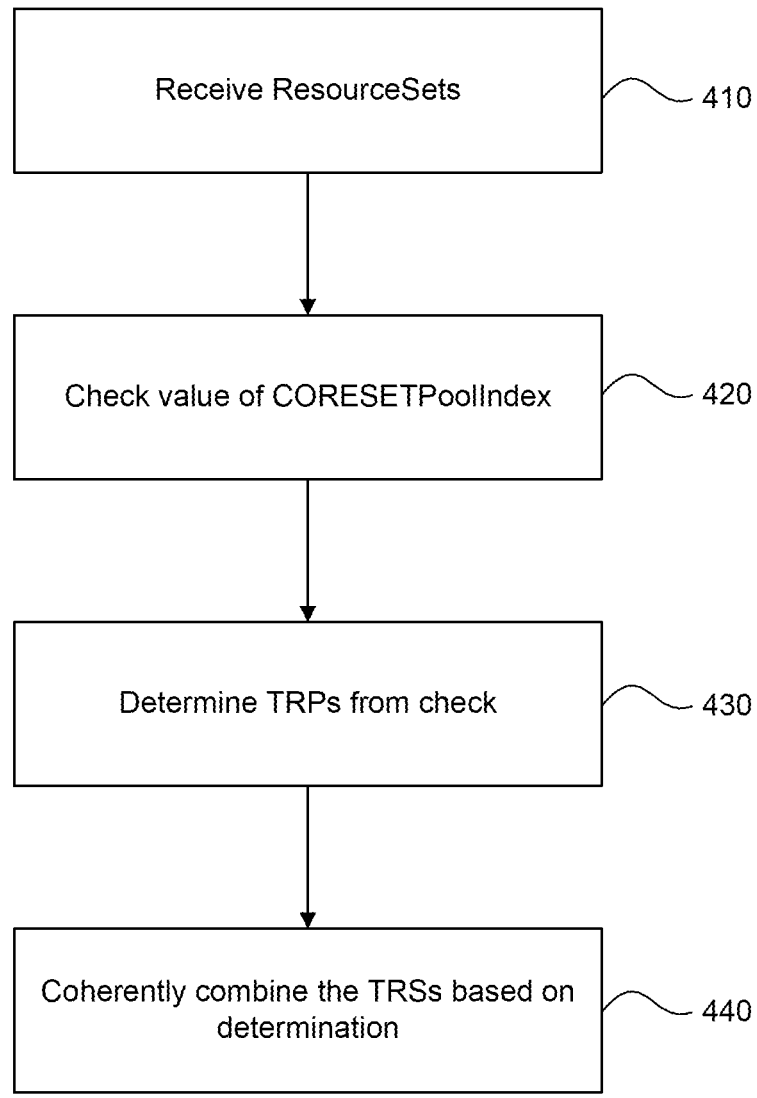
FIG. 4 illustrates a flowchart diagram of an exemplary method for a UE tracking TRSs from multiple TRPs according to an aspect of the disclosure.

FIG. 4 illustrates a flowchart diagram of an exemplary method 400 for a UE tracking TRSs from two TRPs. As shown in FIG. 4, the UE receives TRSs from each of two different TRPs, that each include ResourceSets (410). For all NZP CSI-RS ResourceSet in which the TRS is configured, the UE checks the value of the variable CORESETPoolIndex (420).

A CORESETPoolIndex value of 0 indicates that the TRS is from the first TRP, whereas a CORESETPoolIndex value of 1 indicates that the TRS is from the second TRP. Thus, the UE determines the origins of the TRPs based on the values of the CORESETPoolIndex variables in the ResourceSets (430). Once the origins of the different TRSs are identified, the UE can carry out Doppler compensation, and then coherently combine the TRSs based on their origins and respective frequency shifts (440).

Figure 5:
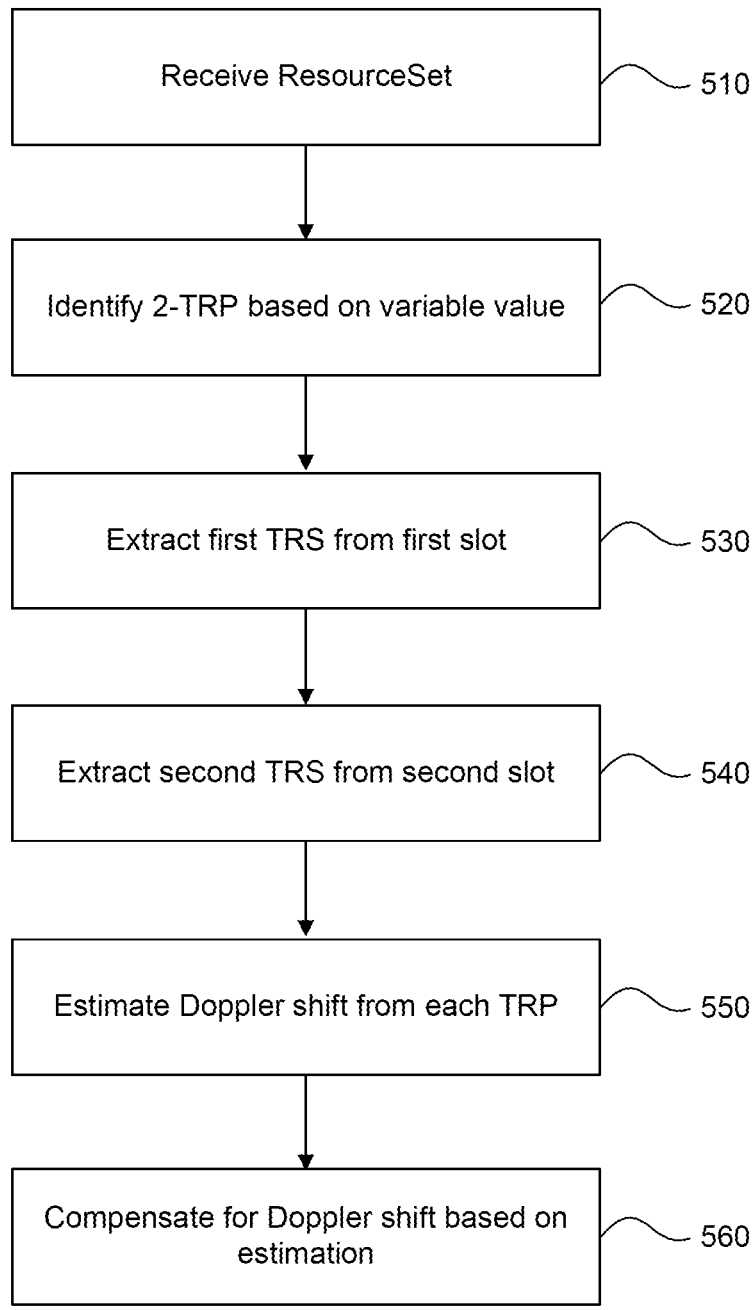
FIG. 5 illustrates a flowchart diagram of an exemplary method for compensating Doppler shift in a user equipment according to an aspect of the disclosure.

FIG. 5 illustrates a flowchart diagram of an exemplary method 500 for compensating Doppler shift in a UE. Once again, the UE receives a TRS from a TRP that has a ResourceSet defined therein (510). Within the ResourceSet is a variable trs-info. The UE identifies whether the received TRS includes the TRS information for two TRPs based on the value of the trs-info variable (520). In response to determining that the TRS is a 2-TRP TRS, the UE extracts first TRS information corresponding to the first TRP from a first slot (530), and extracts second TRS information corresponding to the second TRP from a second slot (540).

Using this information, the UE estimates the Doppler shift associated with each of the TRPs (550). The UE then compensates for these Doppler shifts applied to signals received from the different TRPs (560).

Figure 6:
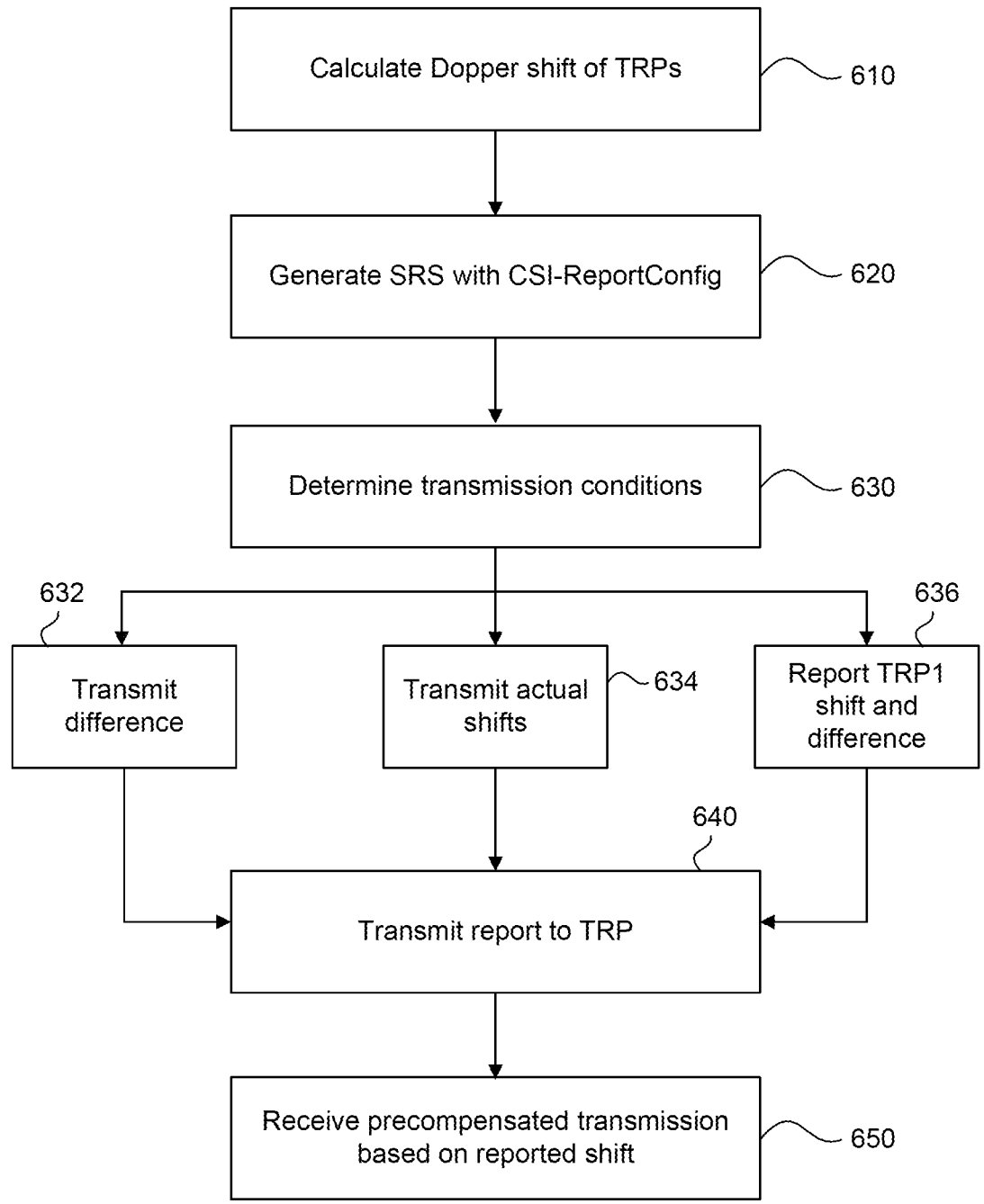
FIG. 6 illustrates a flowchart diagram of an exemplary method for precompensating Doppler shift by a base station according to an aspect of the disclosure.

FIG. 6 illustrates a flowchart diagram of an exemplary method 600 for precompensating Doppler shift according to an embodiment. As shown in FIG. 6, the UE first calculates Doppler shift associated with each of multiple TRPs (610) in any manner described above. The UE then generates a Sounding Reference Signal (SRS) having a CSI-ReportConfig field (620).

The UE determines transmission conditions or other parameters (630), and then in response to that determination fills the CSI-ReportConfig field accordingly. For example, based on the transmission conditions, the UE either transmits the difference (632) between the first TRP Doppler shift and the second TRP Doppler shift, the actual shifts (634) corresponding to each of the first TRP and the second TRP, or the actual shift of the first TRP and the difference between that shift and the shift of the second TRP (636). The UE then transmits this report to the TRP (640). Thereafter, the UE receives signals from the TRP that are precompensated based on the reported shifts (650).

Figure 8:
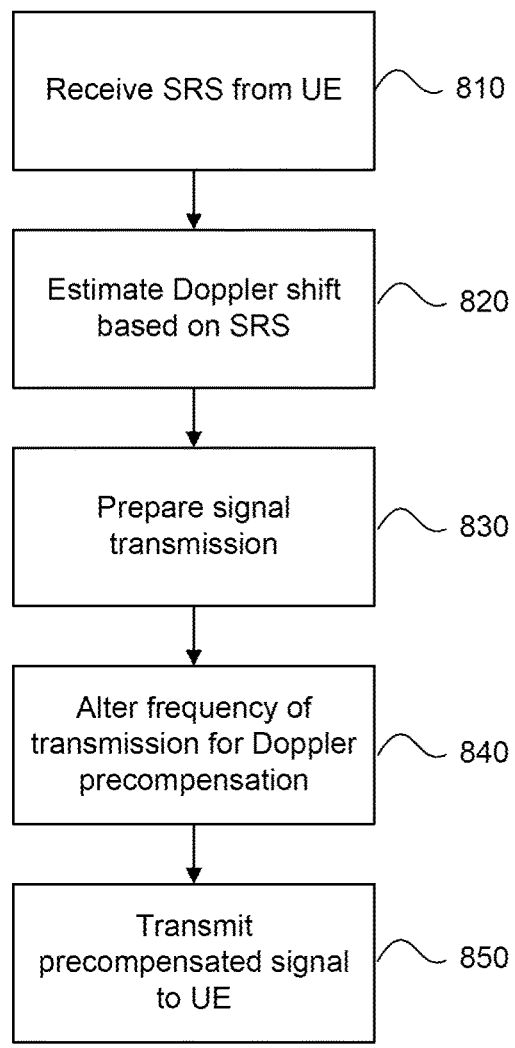
FIG. 8 illustrates a flowchart diagram of an exemplary method for precompensating for Doppler shift by a TRP according to an aspect of the present disclosure.

FIG. 8 illustrates a flowchart diagram of an exemplary method for precompensating for Doppler shift by a TRP according to an aspect of the present disclosure. As shown in FIG. 8, the TRP first receives a sounding reference signal (SRS) from the UE (810). In an embodiment, the transmission of the SRS by the UE is frequency locked based on the TRS so that the TRP can make sure which frequency, the UE is transmitting the SRS on. This allows the TRP to accurately determine the Doppler shift. Further, in an embodiment, the SRS is transmitted by the UE with the same beam used for the reception of the TRS. In still a further embodiment, the SRS is transmitted by the UE with the power control based on the pathloss estimated from the TRS.

Based on the received SRS, the TRP estimates the Doppler shift (820) of signals transmitted to the UE. Sometime thereafter, the TRP prepares a signal transmission to the UE (830). Based on the previously-calculated Doppler estimation, the TRP alters the frequency of the transmission (840) in order to precompensate for the expected Doppler shift that will occur during transmission. The TRP then transmits the frequency-altered signal to the UE (850).

Figure 9:
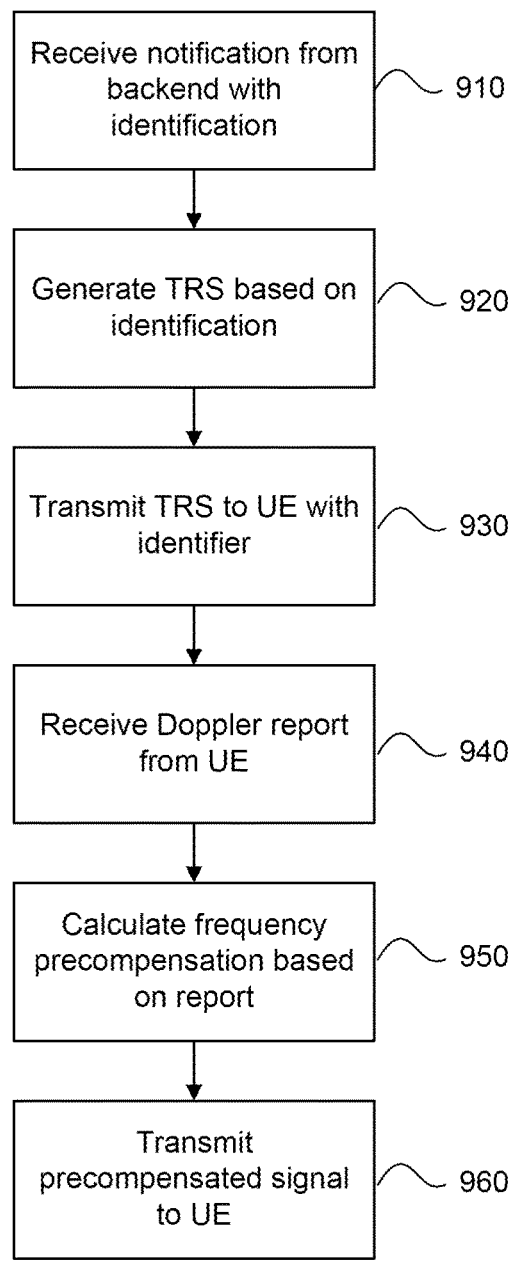
FIG. 9 illustrates a flowchart diagram of an exemplary method for precompensating for Doppler shift by a TRP according to an aspect of the present disclosure.

FIG. 9 illustrates a flowchart diagram of an exemplary method for precompensating for Doppler shift by a TRP according to an aspect of the present disclosure. As shown in FIG. 9, a TRP receives a notification from the backend identifying the TRP as one of a first or a second TRP (910). Based on the received notification, the TRP generates a TRS signal (920) for sending to the UE. Subsequently, the TRP transmits the TRS to the UE with an identifier or other identifying information (930) so as to identify the TRP as the source of the IRS information. The TRP receives a Doppler report from the UE (940) in response to the TRS that includes a Doppler measurement or other information sufficient for the TRP to estimate the Doppler shift. The TRP calculates a frequency precompensation (950) based on the information in the Doppler report, and then transmits a precompensated transmission signal to the UE (960).

Although the above method has been described according to one implementation, it should be understood that many of the steps may be carried out in different order or omitted according to the specific circumstances of the application.

Figure 10:
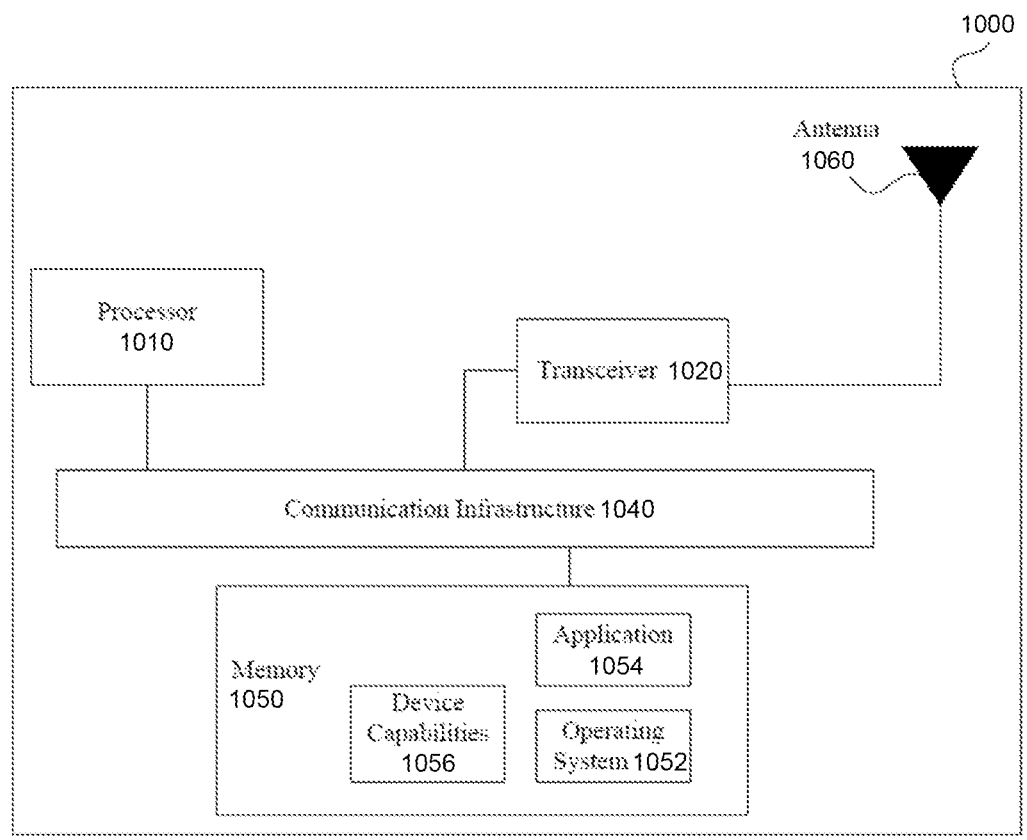
FIG. 10 illustrates a block diagram of an example system of an electronic device implementing Doppler shift compensation, according to some aspects of the disclosure.

FIG. 10 illustrates a block diagram of an example system of an electronic device 1000 implementing Doppler shift compensation, according to some aspects of the disclosure. System 1000 may be any of the electronic devices (e.g., the TRP 110, the UE 102) of system 100. The system 1000 includes a processor 1010, one or more transceivers 1020, communication infrastructure 1040, memory 1050, operating system 1052, application 1054, and one or more antenna 1060. Illustrated systems are provided as exemplary parts of system 1000, and system 1000 can include other circuit(s) and subsystem(s). Also, although the systems of system 1000 are illustrated as separate components, the aspects of this disclosure can include any combination of these, less, or more components.

Memory 1050 may include random access memory (RAM) and/or cache, and may include control logic (e.g., computer software) and/or data. Memory 1050 may include other storage devices or memory such as, but not limited to, a hard disk drive and/or a removable storage device/unit. According to some examples, operating system 1052 can be stored in memory 1050. Operating system 1052 can manage transfer of data from memory 1050 and/or one or more applications 1054 to processor 1010 and/or one or more transceivers 1020. In some examples, operating system 1052 maintains one or more network protocol stacks (e.g., Internet protocol stack, cellular protocol stack, and the like) that can include a number of logical layers. At corresponding layers of the protocol stack, operating system 1052 includes control mechanism and data structures to perform the functions associated with that layer.

According to some examples, application 1054 can be stored in memory 1050. Application 1054 can include applications (e.g., user applications) used by wireless system 1000 and/or a user of wireless system 1000. The applications in application 1054 can include applications such as, but not limited to, Siri™, FaceTime™, radio streaming, video streaming, remote control, and/or other user applications.

System 1000 can also include communication infrastructure 1040. Communication infrastructure 1040 provides communication between, for example, processor 1010, one or more transceivers 1020, and memory 1050. In some implementations, communication infrastructure 1040 may be a bus. Processor 1010 together with instructions stored in memory 1050 performs operations enabling system 1000 to implement mechanisms for Doppler shift compensation, as described above.

One or more transceivers 1020 transmit and receive communications signals that support mechanisms for Doppler shift compensation. According to some aspects, one or more transceivers 1020 may be coupled to antenna 1060. Antenna 1060 may include one or more antennas that may be the same or different types. One or more transceivers 1020 allow system 1000 to communicate with other devices that may be wired and/or wireless. In some examples, one or more transceivers 1020 can include processors, controllers, radios, sockets, plugs, buffers, and like circuits/devices used for connecting to and communication on networks. According to some examples, one or more transceivers 1020 include one or more circuits to connect to and communicate on wired and/or wireless networks.

According to some aspects of this disclosure, one or more transceivers 1020 can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 1020 can include more or fewer systems for communicating with other devices.

In some examples, one or more transceivers 1020 can include one or more circuits (including a WLAN transceiver) to enable connection(s) and communication over WLAN networks such as, but not limited to, networks based on standards described in IEEE 802.11.

Additionally, or alternatively, one or more transceivers 1020 can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, one or more transceivers transceiver 1020 can include a Bluetooth™ transceiver.

Additionally, one or more transceivers 1020 can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, one or more transceivers 1020 can be configured to operate according to one or more of Rel-15, Rel-16, Rel-17, or later of 3GPP standard.

According to some aspects of this disclosure, processor 1010, alone or in combination with computer instructions stored within memory 1050, and/or one or more transceiver 1020, implements the methods and mechanisms discussed in this disclosure. For example, processor 1010, alone or in combination with computer instructions stored within memory 1050, and/or one or more transceiver 1020, implements mechanisms for Doppler shift compensation. According to some aspects of this disclosure, processor 1010, alone or in combination with computer instructions stored within memory 1050, and/or one or more transceiver 1020, receive reference signals from multiple TRPs and determine their origins.

Figure 7:
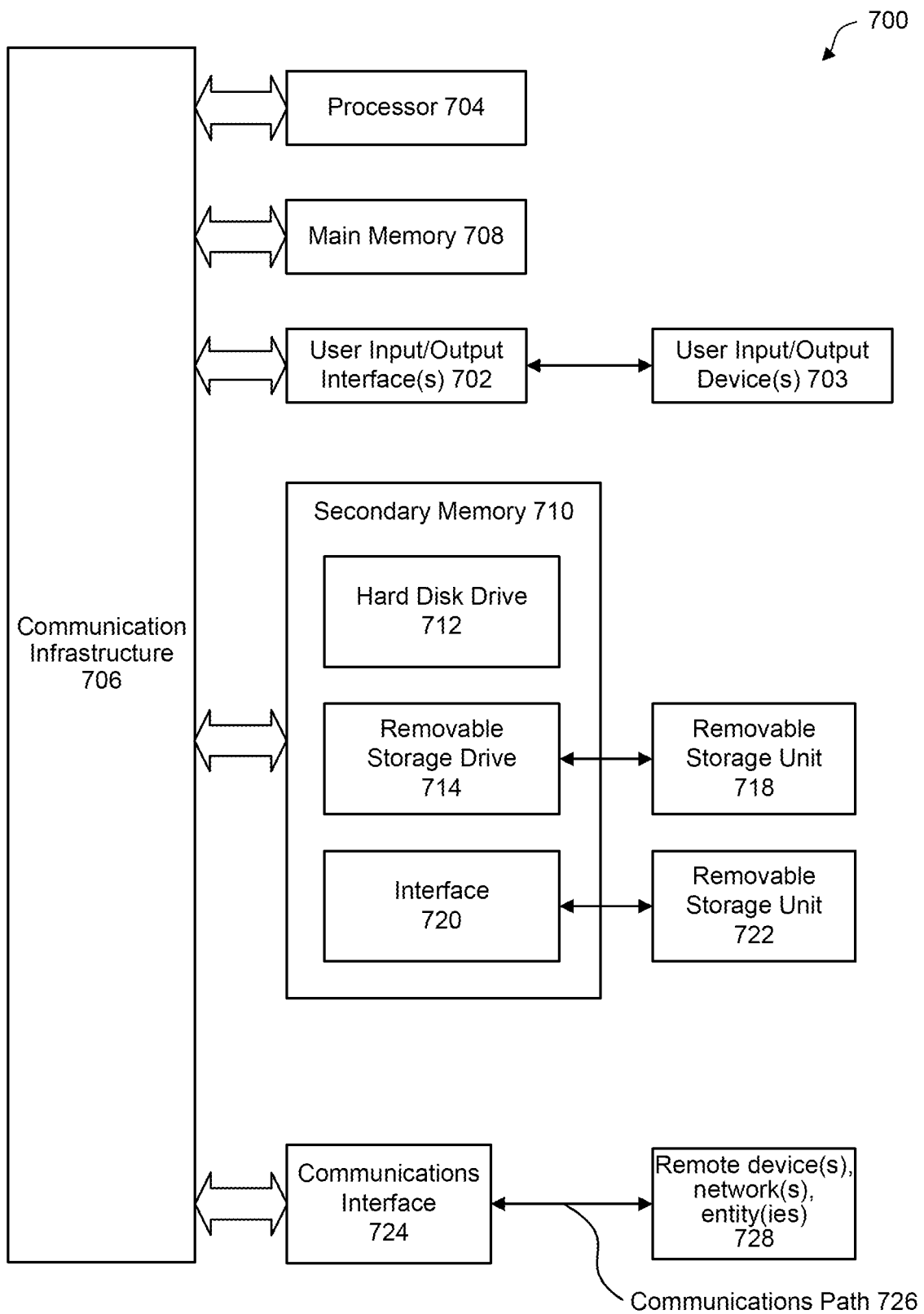
FIG. 7 illustrates a block representation of an exemplary generic computer system capable of implementing certain aspects of the present disclosure.

Various aspects can be implemented, for example, using one or more computer systems, such as computer system 700 shown in FIG. 7. Computer system 700 can be any well-known computer capable of performing the functions described herein such as devices 710, 720 of FIG. 7, or 200 of FIG. 2. Computer system 700 includes one or more processors (also called central processing units, or CPUs) such as a processor 704. Processor 704 is connected to a communication infrastructure 706 (e.g., a bus.) Computer system 700 also includes user input/output device(s) 703, such as monitors, keyboards, pointing devices, etc., that communicate with communication infrastructure 706 through user input/output interface(s) 702. Computer system 700 also includes a main or primary memory 708, such as random access memory (RAM). Main memory 708 may include one or more levels of cache. Main memory 708 has stored therein control logic (e.g., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to some aspects, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 708, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 7. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary aspects of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific aspects will so fully reveal the general nature of the disclosure that others can, by applying knowledge within the skill of the art, readily modify and/or adapt for various applications such specific aspects, without undue experimentation, without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary aspects, but should be defined only in accordance with the following claims and their equivalents.

Examples

Example 1 includes a user equipment having a transceiver configured to transmit and receive signals between a first transmission-reception point (TRP) and a second TRP; and one or more processors configured to: receive reference signals from a plurality of TRPs via the transceiver, each reference signal including a identifier; determine an originating TRP as being one of the first TRP or the second TRP based on the identifier; calculate Doppler shifts associated with each of the first TRP and the second TRP based on the determining; coherently combine the plurality of reference signals based on the calculating; and transmit an uplink signal via the transceiver to at least one of the first TRP or the second TRP based on the combined plurality of reference signals.

Example 2 includes the user equipment of example 1, wherein the identifier is a CORESETPoolIndex variable.

Example 3 includes the user equipment of example 2, wherein a CORESETPoolIndex value of 0 identifies the first TRP as the originating TRP, and wherein a CORESETPoolIndex value of 1 identifies the second TRP as the originating TRP.

Example 4 includes the user equipment of example 2, wherein a CORESETPoolIndex variable being absent in the received reference signals identifies the first TRP as the originating TRP.

Example 5 includes the user equipment of example 1, wherein the reference signals are included within corresponding Tracking Reference Signals (TRSs) transmitted from the TRPs.

Example 6 includes the user equipment of example 1, wherein the reference signals are transmitted within Downlink Control Information (DCI).

Example 7 includes the user equipment of example 1, wherein the reference signals include a first pair of TRS symbols in a first slot associated with the first TRP, and a second pair of IRS symbols in a second slot associated with the second TRP, wherein the first and second slot are consecutive.

Example 8 includes a user equipment for reporting Doppler shift to a TRP, the user equipment comprising: a transceiver configured to transmit and receive signals with a first transmission-reception point (TRP) and a second TRP; and one or more processors configured to: receive a reference signal from at least one the first TRP and the second TRP; estimate a Doppler shift associated with each of the first TRP and the second TRP based on the received reference signal; generate a reporting signal based on the estimated Doppler shift; and transmit the reporting signal to the TRP via the transceiver.

Example 9 includes the user equipment of example 8, wherein the one or more processors are further configured to determine a reporting scheme based on the estimated Doppler shift.

Example 10 includes the user equipment of example 8, wherein the reporting signal includes a signed difference value corresponding to the difference between a Doppler shift associated with the first TRP and a Doppler shift associated with the second TRP.

Example 11 includes the user equipment of example 8, wherein the reporting signal includes a first Doppler shift associated with the first TRP and a second Doppler shift associated with the second TRP.

Example 12 includes the user equipment of example 8, wherein the reporting signal includes an unsigned absolute value of a difference between a first Doppler shift associated with the first TRP and a second Doppler shift associated with the second TRP.

Example 13 includes the user equipment of example 8, wherein the reporting signal includes a first Doppler shift associated with the first TRP, and a difference value corresponding to a difference between the first Doppler shift and a second Doppler shift associated with the second TRP.

Example 14 includes the user equipment of example 8, wherein the reporting signal is a CSI message, and wherein Doppler shift information is encoded into a CSI-ReportConfig field of the CSI message.

Example 15 includes a base station for compensating for Doppler shift in a high-speed environment, the base station comprising: a transceiver configured to communicate with a user equipment (UE); and one or more processors configured to: receive a notification from a backend as to whether the base station is a first base station or a second base station; generate a tracking reference signal based on the received notification; and transmit the tracking reference signal to the UE, wherein the tracking reference signal includes an identifier based on the received notification.

Example 16 includes the base station of example 15, wherein the identifier is a value of a variable within the tracking reference signal.

Example 17 includes the base station of example 16, wherein the variable is a CORESETPoolIndex, and wherein the one or more processors are further configured to: set the value of the variable to 0 in response to the received notification indicating that the base station is the first TRP; and set the value of the variable to 1 in response to the received notification indicating that the base station is the second TRP.

Example 18 includes the base station of example 15, wherein the one or more processors are further configured to: receive a reporting signal from the UE, the reporting signal including Doppler shift information associated with the base station; calculate a precompensation based on the received Doppler shift information; and generate a signal transmission to the UE based on the calculated precompensation.

Example 19 includes the base station of example 18, wherein the precompensation increases a frequency of the signal transmission in response to the Doppler shift information demonstrating a negative frequency shift, and wherein the precompensation decreases the frequency of the signal transmission in response to the Doppler shift information demonstrating a positive frequency shift.

Example 20 includes the base station of claim 15, wherein the one or more processors are further configured to receive a two-TRP flag from the backend, and wherein, in response to two-TRP flag, the generating the tracking reference signal includes transmitting reference information within only one of a first slot or a second slot of the tracking reference signal based on the received notification.

Example 21 includes any of the examples described above, wherein the user equipment is located on a high-speed train.

Example 22 includes any of the examples described above, wherein the UE recognizes a triggered Aperiodic Tracking Reference Signal (AP-TRS) and a corresponding Periodic Tracking Reference Signal (P-TRS) transmitted from one of the first TRP or the second TRP based on information within a Downlink Control Information (DCI).

Example 23 includes example 22, wherein the UE recognizes the AP-TRS and the P-TRS as originating from the first TRP in response to a CORESETPoolIndex value being 1.

Example 24 includes example 22, wherein the UE recognizes the AP-TRS and the P-TRS as originating from the second TRP in response to a CORESETPoolIndex value being 0.

Example 25 includes any of the above examples, wherein an information element (IE) within a zero power (ZP) CSI-RS-ResourceSet enables HST TRS at the UE when indicated.

Example 26 includes example 25, wherein the HST TRS identifies a 2-TRP TRS to be processed.

Example 27 includes example 26, wherein the TRS resources within a first slot of the 2-TRP TRS and the TRS resources within a second slot of the 2-TRP TRS are quasi-colocated.

Example 28 includes example 26, wherein the TRS resources within the first and second slots are QCL-typeA and QCL-typeD.

Example 29 includes example 26, wherein the 2-TRP TRS is configured for FR1 only when the configured TRS occupies at least 52 Physical Resource Blocks in the frequency domain.

Example 30 includes any of the above examples, wherein HST mode is configured via Radio Resource Control (RRC).

Example 31 includes any of examples 1-29, wherein HST mode is configured via Medium Access Control Control Element (MAC-CE).

Example 32 includes a method of operating a user equipment (UE), the method comprising: receiving, using a transceiver, a tracking reference signal (TRS) from a transmission reception point (TRP); determining a frequency of the TRS; generating a sounding reference signal (SRS) having the frequency of the TRS received the TRP; and transmitting, using the transceiver, the SRS to the TRP to enable the TRP to determine a Doppler shift associated with a wireless communication between the TRP and the UE.

Example 34 includes a method of operating a user equipment (UE), the method comprising: receiving, using a transceiver, a tracking reference signal (IRS) from a transmission reception point (TRP); identifying a beam or beam direction of a number of beams or beam directions used for reception of the TRS; generating a sounding reference signal (SRS); and transmitting, using the transceiver, the SRS to the TRP using the identified beam or beam direction, to enable the TRP to determine a Doppler shift associated with a wireless communication between the TRP and the UE.

Example 35 includes a method of operating a user equipment (UE), the method comprising: receiving, using a transceiver, a tracking reference signal (TRS) from a transmission reception point (TRP); estimating a pathloss between the TRP and the IRS based on the TRS; generating a sounding reference signal (SRS) using a power control on the SRS based on the pathless; and transmitting, using the transceiver, the SRS to the TRP using to enable the TRP to determine a Doppler shift associated with a wireless communication between the TRP and the UE.

Example 36 includes anyone of examples 33-35 implemented by one or more processors of the UE.

What is claimed is:

1. A user equipment comprising:
   a transceiver configured to transmit and receive signals between a first transmission-reception point (TRP) and a second TRP: and
   one or more processors configured to:
     receive reference signals from a plurality of TRPs via the transceiver, each reference signal including an identifier;
     determine an originating TRP as being one of the first TRP or the second TRP based on the identifier;
     calculate Doppler shifts associated with each of the first TRP and the second TRP based on the determining;
     coherently combine the plurality of reference signals based on the calculating; and
     transmit an uplink signal via the transceiver to at least one of the first TRP or the second TRP based on the combined plurality of reference signals; and
     generate and transmit a reporting signal based on the calculated Doppler shifts, the reporting signal including an absolute first Doppler shift associated with the first TRP, and a difference value corresponding to a difference between the absolute first Doppler shift and an absolute second Doppler shift associated with the second TRP, together with the signs of the absolute first Doppler shift and the absolute second Doppler shift.

2. The user equipment of claim 1, wherein the identifier is a CORESETPoolIndex variable.

3. The user equipment of claim 2, wherein a CORESETPoolIndex value of 0 identifies the first TRP as the originating TRP, and
   wherein a CORESETPoolIndex value of 1 identifies the second TRP as the originating TRP.

4. The user equipment of claim 2, wherein a CORESETPoolIndex variable being absent in the received reference signals identifies the first TRP as the originating TRP.

5. The user equipment of claim 1, wherein the reference signals are included within corresponding Tracking Reference Signals (TRSs) transmitted from the TRPs.

6. The user equipment of claim 1, wherein the reference signals from the plurality of TRPs are triggered with Downlink Control Information (DCI) received in a CORESET configured with a corresponding CORESETPoolIndex.

7. The user equipment of claim 1, wherein the reference signals include a first pair of Tracking Reference Signal (TRS) symbols in a first slot associated with the first TRP, and a second pair of TRS symbols in a second slot associated with the second TRP, wherein the first and second slot are consecutive.

8. A user equipment for reporting Doppler shift to a transmission-reception point (TRP), the user equipment comprising:
   a transceiver configured to transmit and receive signals with a first TRP and a second TRP; and one or more processors configured to:
  receive a reference signal from at least one the first TRP and the second TRP;
  estimate a Doppler shift associated with each of the first TRP and the second TRP based on the received reference signal;
  generate a reporting signal based on the estimated Doppler shift; and
  transmit the reporting signal to a gNB via the transceiver,
  wherein the reporting signal includes an absolute first Doppler shift associated with the first TRP, and a difference value corresponding to a difference between the absolute first Doppler shift and an second Doppler shift associated with the second TRP, together with the signs of the absolute first Doppler shift and the absolute second Doppler shift.

9. The user equipment of claim 8, wherein the one or more processors are further configured to determine a reporting scheme based on the estimated Doppler shift.

10. The user equipment of claim 8, wherein the difference value is a signed difference value.

11. The user equipment of claim 8, wherein the reporting signal includes an unsigned absolute value of the difference value.

12. The user equipment of claim 8, wherein the reporting signal is a channel state information (CSI) message, and wherein Doppler shift information is encoded into a field in the CSI message configured by CSI-ReportConfig.

13. A transmission reception point (TRP) for compensating for Doppler shift in a high-speed environment, the TRP comprising:
  a transceiver configured to communicate with a user equipment (UE); and
  one or more processors configured to:
    receive a notification from a backend as to whether the TRP is a first TRP or a second TRP;
    receive a two-TRP flag from the backend;
    generate a tracking reference signal based on the received notification, the generating including transmitting reference information within only one of a first slot or a second slot of the tracking reference signal based on the received notification;
    transmit the tracking reference signal to the UE,
    wherein the tracking reference signal includes an identifier based on the received notification.

14. The TRP of claim 13, wherein the identifier is a value of a variable within the tracking reference signal.

15. The TRP of claim 14, wherein the variable is a CORESETPoolIndex, and wherein the one or more processors are further configured to:
  set the value of the variable to 0 in response to the received notification indicating that the TRP is the first TRP; and
  set the value of the variable to 1 in response to the received notification indicating that the TRP is the second TRP.

16. The TRP of claim 13, wherein the one or more processors are further configured to:
  receive a reporting signal from the UE, the reporting signal including Doppler shift information associated with the TRP;
  calculate a precompensation based on the received Doppler shift information; and generate a signal transmission to the UE based on the calculated precompensation.

17. The TRP of claim 16, wherein the precompensation increases a frequency of the signal transmission in response to the Doppler shift information demonstrating a negative frequency shift, and wherein the precompensation decreases the frequency of the signal transmission in response to the Doppler shift information demonstrating a positive frequency shift.

* * * * *